(12) United States Patent
Seo et al.

(10) Patent No.: US 10,691,921 B2
(45) Date of Patent: *Jun. 23, 2020

(54) DISPLAY DEVICE (71) Applicant: LG Display Co., Ltd., Seoul (KR)

(72) Inventors: DooWon Seo, Bucheon-si (KR);
HeungJu Jo, Chungju-si (KR);
SangHyun Kwon, Paju-si (KR);
EuiJun Lee, Seoul (KR); YongBeom Jeong, Seoul (KR); JeongKweon Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 90 days.

This patent is subject to a terminal disclaimer.

(21) Appl. No.: 16/107,094

(22) Filed: Aug. 21, 2018

(65) Prior Publication Data

US 2019/0087630 A1  Mar. 21, 2019

(30) Foreign Application Priority Data

Sep. 15, 2017 (KR) ........................ 10-2017-0118525

(51) Int. Cl.
*G06K 9/20* (2006.01)
*G06K 9/00* (2006.01)
*G06F 3/044* (2006.01)
*G06F 1/16* (2006.01)

(52) U.S. Cl.
CPC ......... *G06K 9/0012* (2013.01); *G06F 1/1684* (2013.01); *G06F 3/044* (2013.01); *G06K 9/0002* (2013.01); *G06K 9/00053* (2013.01); *G06K 9/00899* (2013.01)

(58) Field of Classification Search
CPC ... G06K 9/00006–0012; G06K 9/0002; G06K 9/209; H01L 27/3272; H01L 51/5281; H01L 27/323; H01L 27/3234; H01L 27/3244; H01L 51/0097; H01L 51/52; H01L 51/529; H01L 2251/5338; B06B 1/0692; G06F 1/1643; G06F 1/1684; G06F 1/1696; G06F 3/0412; H04R 1/028; H04R 17/00; H04R 2499/15
See application file for complete search history.

(56) References Cited

U.S. PATENT DOCUMENTS

2018/0373913 A1* 12/2018 Panchawagh ........ G06K 9/0002

FOREIGN PATENT DOCUMENTS

EP  3 147 824 A1  3/2017

OTHER PUBLICATIONS

European Patent Office, Extended European Search Report, EP Patent Application No. 18194582.5, dated Feb. 4, 2019, 16 pages.

\* cited by examiner

*Primary Examiner* — Brian Werner
(74) *Attorney, Agent, or Firm* — Fenwick & West LLP (57) ABSTRACT A display device comprises a display panel configured to display an image. A fingerprint sensor is under the display panel and is configured to sense a fingerprint. An impact mitigating layer partially surrounds the fingerprint sensor and is configured to absorb impacts or pressure to the display device. A shielding layer is between the display panel and the fingerprint sensor and the impact mitigating layer. The shielding layer blocks at least one of heat, electromagnetic interference, or light.

20 Claims, 8 Drawing Sheets

DISPLAY DEVICE

CROSS-REFERENCE TO RELATED APPLICATIONS

This application claims the priority of Republic of Korea Patent Application No. 10-2017-0118525 filed on Sep. 15, 2017, in the Korean Intellectual Property Office, the disclosure of which is incorporated by reference in its entirety.

BACKGROUND

Technical Field

The present disclosure relates to a display device, and more particularly, to a display device including a fingerprint sensor located in a display area.

Description of the Related Art

Recently, a display device including a fingerprint sensor which is capable of recognizing fingerprints is getting the spotlight. There is an advantage in that a security problem of the display device is solved by recognizing a fingerprint of a user. However, in the conventional display device, a bezel size is undesirably increased in accordance with a position of the fingerprint sensor placed in the bezel area. In other words, when the fingerprint sensor is located in the non-display area, the bezel size, namely, the size of the non-display area cannot be reduced due to the area of the fingerprint sensor.

Therefore, there is a demand to dispose the fingerprint sensor in the display area itself, rather than in the non-display area.

SUMMARY

A problem occurs in signal recognition of the fingerprint sensor when the fingerprint sensor is disposed below the cushion tape. In such implementation, a cushion tape may be disposed in a lower area of the display panel to absorb pressure being applied to the fingerprint sensor that is located below the cushion tape in the display area. However, in this case, there are some problems in signal recognition with respect to the fingerprint sensor due to the cushion tape.

Therefore, a display device with a new structure in which a portion of the cushion tape is removed or patterned, to allow the fingerprint sensor to be positioned where the part of the cushion tape is removed or patterned is disclosed.

However, undesirable space between the cushion tape and the fingerprint sensor may exist. In this case, light and heat may affect the display device through such space or gap between the cushion tape and the fingerprint sensor. Therefore, the display panel may be damaged by the light and heat that enters the display device. Therefore, the inventors of the present disclosure invented a display device with a new structure which may sufficiently block the light and heat entered through the space between the cushion tape and the fingerprint sensor.

In one embodiment, a display device comprises: an electroluminescence display panel including a display area configured to display an image, the display area including a first area and a second area that is distinct from the first area, the first area for sensing a finger print and displaying the image, and the second area for displaying the image but not for sensing the fingerprint; an ultrasonic fingerprint sensor under the electroluminescence display panel and in the first area of the display area but not in the second area of the display area, the ultrasonic fingerprint sensor configured to sense the fingerprint in the first area of the display area; an impact mitigating layer in the second area of the display area but not in the first area of the display area and configured to absorb impacts or pressure to the display device, the impact mitigating layer under the electroluminescence display panel and at least partially surrounding the ultrasonic fingerprint sensor such that a gap is formed between the impact mitigating layer and the ultrasonic fingerprint sensor; and a shielding layer between the electroluminescence display panel and the ultrasonic fingerprint sensor and the impact mitigating layer that are under the electroluminescence display panel and covering the gap, the shielding layer configured to block at least one of heat, electromagnetic interference, or light from the gap.

In one embodiment, a display device comprises: a first impact mitigating portion of an impact mitigating layer that is capable of absorbing impacts or pressure applied to the display device; a second impact mitigating portion of the impact mitigating layer that is capable of absorbing impacts or pressure applied to the display device, the second impact mitigating portion in a same plane as the first impact mitigating portion; an ultrasonic fingerprint sensor between the first impact mitigating portion and the second impact mitigating portion such that a first gap is formed between the ultrasonic fingerprint sensor and the first impact mitigating portion and a second gap is formed between the ultrasonic fingerprint sensor and the second impact mitigation portion, the ultrasonic fingerprint sensor configured to sense a fingerprint of a finger touching the display device; a shielding layer on the first impact mitigating portion, the second impact mitigating portion, and the ultrasonic fingerprint sensor, the shielding layer configured to block at least one of heat, electromagnetic interference, or light from the first gap and the second gap; and an electroluminescence display panel on the shielding layer, the electroluminescence display panel configured to display an image.

In one embodiment, a display device comprises: an electroluminescence display panel including a display area configured to display an image; an ultrasonic fingerprint sensor under the electroluminescence display panel; an impact mitigating layer under the electroluminescence display panel, wherein a gap is formed between the impact mitigating layer and the ultrasonic fingerprint sensor; and a shielding layer overlapping at least the gap and the ultrasonic fingerprint sensor, the shielding layer configured to shield the electroluminescence display panel and the ultrasonic fingerprint sensor from each other.

Objects of the present disclosure are not limited to the above-mentioned objects, and other objects, which are not mentioned above, can be clearly understood by those skilled in the art from the following descriptions.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Advantages and characteristics of the present disclosure and a method of achieving the advantages and characteristics will be clear by referring to exemplary embodiments described below in detail together with the accompanying drawings. However, the present disclosure is not limited to exemplary embodiments disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is disposed "on" other element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely bonded to or combined with each other and can be interlocked and operated in technically various ways understood by those skilled in the art, and the embodiments can be carried out independently of or in association with each other.

Hereinafter, various exemplary embodiments of the present disclosure will be described in detail with reference to accompanying drawings.

Figure 1A:
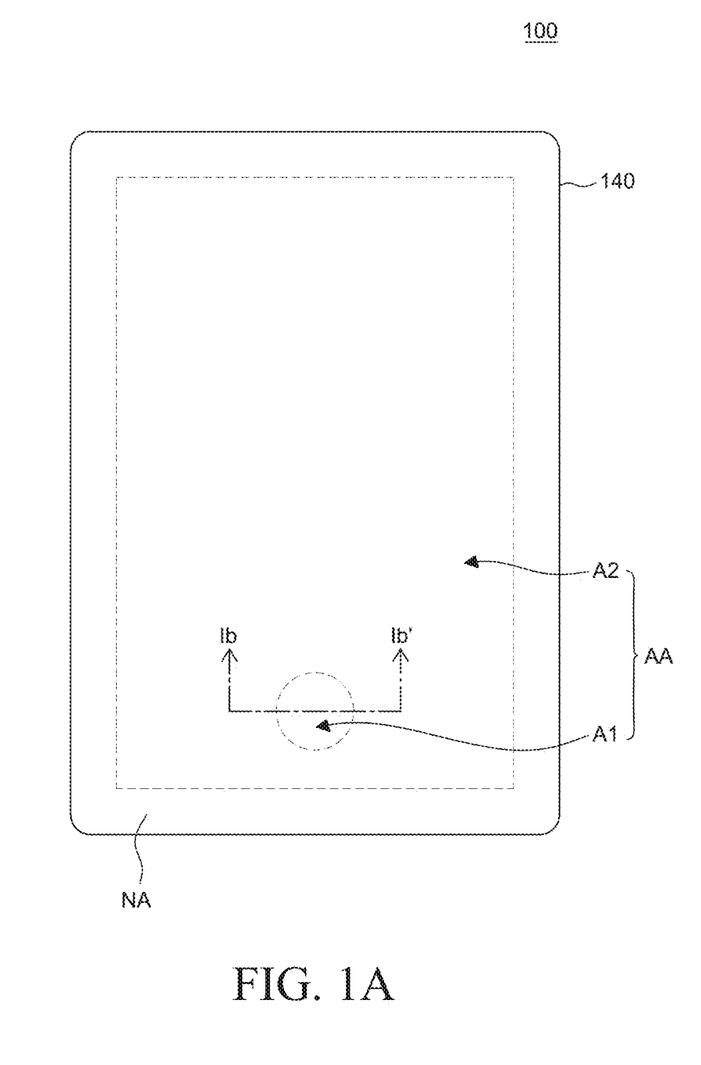
FIG. 1A is a plan view of a display device according to an exemplary embodiment of the present disclosure.
Figure 1B:
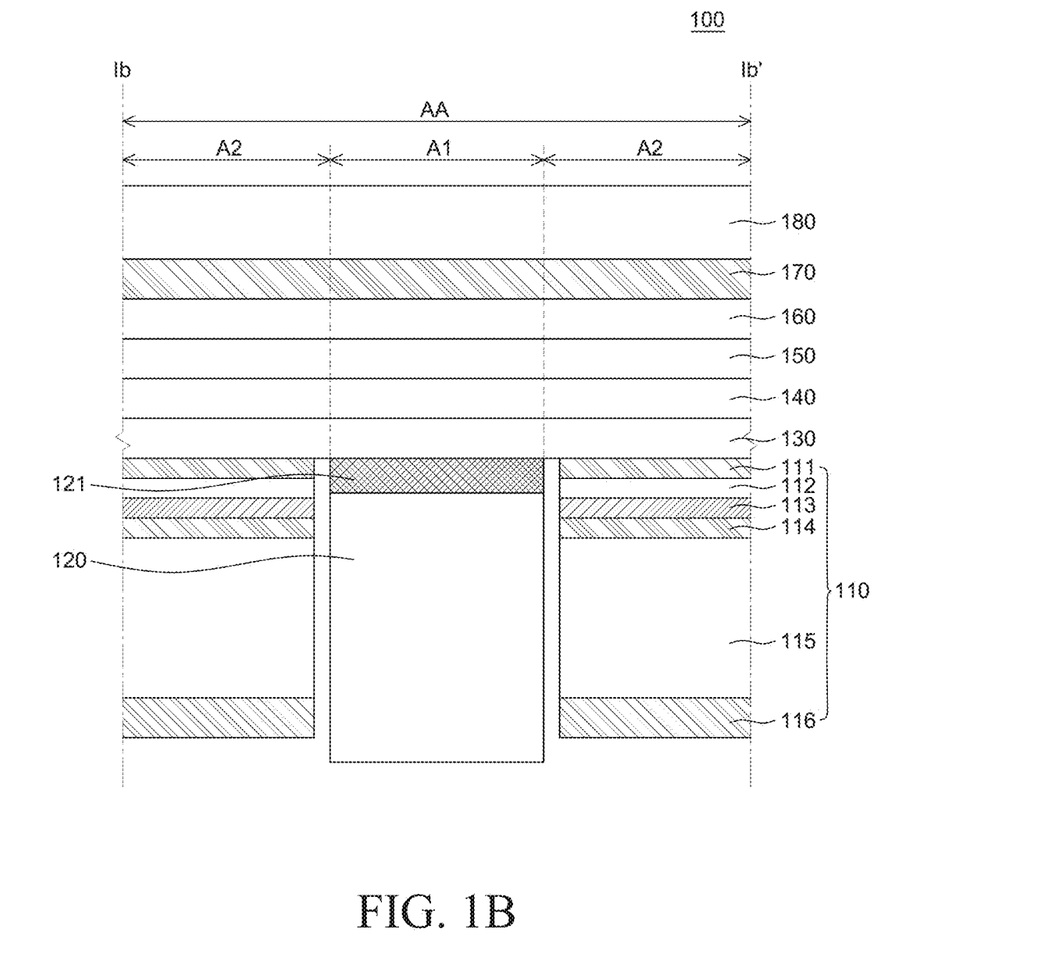
FIG. 1B is a cross-sectional view taken along Ib-Ib' of FIG. 1A according to an exemplary embodiment of the present disclosure.

FIG. 1A is a plan view of a display device according to an exemplary embodiment of the present disclosure and FIG. 1B is a cross-sectional view taken along Ib-Ib' of FIG. 1A.

Referring to FIG. 1A, a display device 100 includes a display panel 140. The display panel 140 may include a display element configured to display an image, and various driving elements which drive the display element, and wiring lines. The display panel 140 also includes a substrate. In one embodiment, the substrate is flexible and may be made of plastic or any other material with elastic deformation properties. Hereinafter, an example in which the display panel 140 is an electroluminescence display panel including an electroluminescence display element will be described, but the display panel is not limited thereto. The display panel 140 includes a display area AA and a non-display area NA.

The display area AA is an area in which an image is displayed in the display device 100 and a display element and various driving elements for driving the display element are disposed in the display area AA. The display area AA includes a first area A1 and a second area A2 excluding the first area A1. That is, the second area A2 is not included in the first area A1.

The non-display area NA is adjacent to the display area AA. In the non-display area NA, an image is not displayed and wiring lines or circuit units are formed.

Referring to FIG. 1B, a back plate 130 is disposed below the display panel 140. The back plate 130 is a substrate which supports and protects the display panel 140. The back plate 130 also supports the fingerprint sensor 120 and makes the display panel 140 rigid so as to prevent a mark from occurring on the display panel when the fingerprint sensor 120 is attached to the display panel. The back plate 130 may be formed of a plastic material. When the back plate 130 is formed of a plastic material, for example, the back plate 130 may be formed of polyethylene terephthalate (PET), but is not limited thereto.

In the second area A2 below the back plate 130, a cushion tape structure 110 for a fingerprint sensor 120 may be disposed. The cushion tape structure 110 for a fingerprint sensor 120 is a member which absorbs a physical impact (pressure) or blocks heat to protect components of the display device 100 to thus improve the performance of the fingerprint sensor 120 and/or the display panel 140. Specifically, the cushion tape structure 110 may include a first adhesive layer 111, a black material layer 113, a second adhesive layer 114, an impact mitigating layer 115, and a heat dissipation layer 116 which are laminated in this order from the display panel 140.

The first adhesive layer 111 is disposed in the second area A2 below the back plate 130. The first adhesive layer 111 is an adhesive layer which is disposed between a support layer 112 and the back plate 130 to adhere the cushion tape structure 110 to the back plate 130. The first adhesive layer 111 may be transparent (i.e. have light transmissive characteristics) and for example, may have a thickness of about 13 µm. The first adhesive layer 111 may be formed of an optically clear adhesive (OCA) or a pressure sensitive adhesive (PSA), but is not limited thereto.

The support layer 112 is disposed below the first adhesive layer 111. The support layer 112 is a layer for supporting the black layer 113. The support layer 112 may be formed of a plastic material and for example, may be formed of polyethylene terephthalate (PET), but is not limited thereto. For example, a thickness of the support layer 112 may be 4.5 µm.

The black (material) layer 113 is disposed below the support layer 112. The black layer 113 is an opaque layer which blocks light and heat. The black layer 113 may be configured to include a black dye or pigment. The black layer 113 may be formed below the support layer 112 and the support layer 112 and the black layer 113 may be adhered to the first adhesive layer 111. For example, a thickness of the black layer 113 may be about 3 µm.

The second adhesive layer 114 is disposed below the black layer 113. The second adhesive layer 114 is a layer which adheres the black layer 113 and the impact mitigating layer 115. The second adhesive layer 114 may be configured by the same material as the first adhesive layer 111. The second adhesive layer 114 may be transparent and for example, may have a thickness of 9 µm.

The impact mitigating layer 115 is disposed below the second adhesive layer 114. The impact mitigating layer 115 is a layer which absorbs physical impacts. Specifically, the impact mitigating layer 115 may include a plurality of bubble-like structure (or other type of cushion element) and the plurality of bubbles may effectively absorb the physical impact which is applied to the display device 100. The impact mitigating layer 115 may be formed of acrylic foam, but is not limited thereto. The impact mitigating layer 115 may be opaque and for example, may have a thickness of 80 µm.

The heat dissipation layer 116 is disposed below the impact mitigating layer 115. The heat dissipation layer 116 is a layer which at least partially blocks heat in the cushion tape structure 110. Specifically, the heat dissipation layer 116 is a layer which blocks heat from the lower portion of the display device 100. The heat dissipation layer 116 may be formed of a metal material, and for example, may include copper (Cu). Further, for example, a thickness of the heat dissipation layer 116 may be about 50 µm.

The fingerprint sensor 120 is disposed in the first area A1 below the back plate 130. The fingerprint sensor 120 is a device which can sense certain characteristics of a fingerprint of a finger which is in contact with a surface of the display device 100. Specifically, the cushion tape structure 110 is disposed in the second area A2 and there may be a hole or opening in the first area A1 in which the cushion tape structure 110 is not disposed. In this case, the fingerprint sensor 120 may be disposed in the hole or opening of the first area A1.

Specifically, the fingerprint sensor 120 may be an ultrasonic sensor that emits ultrasonic waves to or through an outer surface of the display device 100 and the ultrasonic waves may be reflected from the surface of the display device 100 having a finger in contact therewith during fingerprint recognition. Therefore, the fingerprint sensor 120 receives the reflected ultrasonic waves to sense the characteristics of the fingerprint. Specifically, air gaps (or air layer) may exist on the surface of the display device 100 due to ridges and valleys of the fingerprint. The reflectance of the ultrasonic waves on the surface which is in contact with the finger may be different from the reflectance on a surface on which the air layer is formed. The fingerprint sensor 120 may recognize the shape of the fingerprint by the difference in amplitudes of the ultrasonic waves reflected from the surface of the display device 100. A method of sensing the shape of the fingerprint using the ultrasonic waves by the fingerprint sensor 120 is not limited thereto.

The third adhesive layer 121 may be disposed above the fingerprint sensor 120. The third adhesive layer 121 is an adhesive layer for adhering the fingerprint sensor 120 to the back plate 130. The third adhesive layer 121 may be formed of an optically clear adhesive (OCA), but is not limited thereto.

The third adhesive layer 121 may be formed of a thermosetting material. The thermosetting material is a material which is hardened by heat and is disposed between the fingerprint sensor 120 and the back plate 130 to be hardened by heat so that the fingerprint sensor 120 is adhered to the back plate 130.

A hardening temperature of the thermosetting material which forms the third adhesive layer 121 may be lower than a temperature at which the display panel 140 is damaged. Specifically, heat may also be applied to the display panel 140 by a process of applying heat to the third adhesive layer 121 disposed between the fingerprint sensor 120 and the back plate 130. In this case, a display element which configures the display panel 140, that is, the organic light emitting element may be damaged by such heat. Therefore, the third adhesive layer 121 may be formed of a thermosetting material which is hardened at a temperature that is lower than a temperature at which the display panel 140 is damaged, as a temperature for minimizing the damage of the display panel 140. For example, the third adhesive layer 121 may be formed of a thermosetting material which is hardened at a temperature of about 60° C. or lower. Therefore, in the display device 100 according to an exemplary embodiment of the present disclosure, the third adhesive layer 121 is formed of a thermosetting material which is hardened at a temperature lower than a temperature at which the display panel 140 is damaged so that the fingerprint sensor 120 and the back plate 130 may be bonded while minimizing the damage of the display panel 140.

In the meantime, the third adhesive layer 121 may be formed of a material having a Young's modulus of 1 gigapascals (GPa) or higher. The Young's modulus is an elastic modulus indicating an extent to which an object is stretched or deformed when both ends of the object are stretched. That is, the Young's modulus may refer to an ability of a material subjected to a tensile strength or a compressive strength in the longitudinal direction which withstands the length changes.

Further, in view of the ultrasonic fingerprint sensing technique, Young's modulus values of the corresponding mediums between a user's finger and the fingerprint sensor may affect acoustic impedance matching characteristics.

In the display device 100 according to the exemplary embodiment of the present disclosure, the third adhesive layer 121 is formed of a material having a Young's modulus of 1 gigapascals (GPa) or higher so that the third adhesive layer 121 may be formed of a material having an acoustic impedance matching that of a layer disposed above the third adhesive layer 121. Further, when an ultrasonic signal is emitted toward two different stacked mediums, the impedance matching case may have less ultrasonic signal reflection at the interface of two different mediums than the impedance mismatching case. Thus, in case of the impedance mismatching case, unwanted reflection may be increased, thereby decreasing the ultrasonic signal sensitivity for fingerprint recognition. In other words, when the acoustic impedances between two mediums do not match, the ultrasonic waves which enter one medium does not effectively enter the other medium, but may be mostly reflected. Accordingly, when the ultrasonic waves enter from one medium into the other medium and the acoustic impedances between two mediums match, a reflectance of the ultrasonic waves at a boundary between the mediums can be reduced. Accordingly, a transmittance of the ultrasonic waves to a next medium can be increased. For example, the back plate 130 may be disposed above the third adhesive layer 121 and the third adhesive layer 121 may be formed of a material having an acoustic impedance matching that of the back plate 130. Since the third adhesive layer 121 is formed of a material having a Young's modulus of 1 GPa or higher, the acoustic impedance thereof may match the acoustic impedance of the back plate 130. Therefore, among the ultrasonic waves which are emitted from the fingerprint sensor 120 into the first adhesive layer 111, a reflectance of the ultrasonic waves reflected from the boundary between the first adhesive layer 111 and the back plate 130 without entering the back plate 130 may be reduced. Accordingly, in the display device 100 according to the exemplary embodiment of the present disclosure, the ultrasonic waves generated from the fingerprint sensor 120 may be easily transmitted in each layer of the display device 100.

A touch panel 150 may be disposed above the display panel 140. The touch panel 150 is an input device which may input information by directly touching the screen using a finger or a pen. The touch panel 150 may be a capacitive type or a resistive type. Further, as illustrated in FIG. 1B, the touch panel 150 may be an add-on type which is disposed above the display panel 140 after being manufactured independently from the display panel 140, but is not limited thereto. The touch panel 150 may be an in-cell type which is embedded in a pixel included in the display panel 140 or an on-cell type which is formed above the display panel 140. The touch panel 150 may be excluded in some embodiments of the present disclosure.

A polarizer 160 may be disposed above the touch panel 150. The polarizer 160 refers to a layer which polarizes the incident light. The polarizer 160 may suppress the visibility of the screen from being lowered due to the reflection of external light. The polarizer 160 may be excluded in some embodiments of the present disclosure.

The fourth adhesive layer 170 may be disposed above the polarizer 160. The fourth adhesive layer 170 is an adhesive layer for bonding the polarizer 160 and a cover glass 180. The fourth adhesive layer 170 may be formed of an optically clear adhesive (OCA) or a pressure sensitive adhesive (PSA), but is not limited thereto. The fourth adhesive layer 170 may be excluded in some embodiments of the present disclosure.

The cover glass 180 may be disposed above the fourth adhesive layer 170. The cover glass 180 is a component which is located at an upper portion of the display device 100 to protect the display device 100. The cover glass 180 may be formed of a tempered glass. The cover glass 180 may be excluded in some embodiments of the present disclosure.

In the display device 100 according to the exemplary embodiment of the present disclosure, the fingerprint sensor 120 may be disposed at a lower portion of the display area AA of the display panel 140 (e.g., under the display panel 140) so that a size of the bezel may be reduced. In addition, at least one fingerprint sensor 120 may be disposed at least one particular area of the display area AA of the display panel. Specifically, as compared with a case when the fingerprint sensor 120 is disposed in the non-display area NA of the display panel 140, as illustrated in FIGS. 1A and 1B, when the fingerprint sensor 120 is disposed at the lower portion of the display area AA of the display panel 140, the fingerprint sensor 120 is not disposed in the non-display area NA so that the size of the bezel may be minimized.

Further, in the display device 100 according to the exemplary embodiment of the present disclosure, the impact mitigating layer 115 may be not disposed above the fingerprint sensor 120 so that the shape of the fingerprint may be effectively sensed. Specifically, when the ultrasonic wave emitted from the fingerprint sensor 120 passes through the impact mitigating layer 115, signal absorption or distortion may be caused. The impact mitigating layer 115 may include a plurality of bubbles so that when the ultrasonic wave passes through the impact mitigating layer 115, signal distortion may be caused due to the difference of a medium of the impact mitigating layer 115 and a medium of the plurality of bubbles. When the impact mitigating layer 115 is disposed above the fingerprint sensor 120, the ultrasonic wave emitted by the fingerprint sensor 120 is reflected from the surface of the display device 100 to pass through the impact mitigating layer 115 while being received by the fingerprint sensor 120 again. Therefore, the fingerprint sensor 120 may receive an ultrasonic wave in which signal distortion is caused and thus, there may be an error in recognizing the shape of the fingerprint. Therefore, in the display device 100 according to the exemplary embodiment of the present disclosure, the impact mitigating layer 115 is not disposed above the fingerprint sensor 120 so that the signal distortion of the ultrasonic wave is suppressed to more accurately sense the shape of the fingerprint.

Further, when the adhesive layer which is formed of a thermosetting material is located above the fingerprint sensor 120, the adhesive layer may not be hardened. Layers such as the fingerprint sensor disposed below the adhesive layer and the display panel disposed above the adhesive layer are not transparent. Therefore, when the adhesive layer which is formed of a thermosetting material is located above the fingerprint sensor 120, the adhesive layer may not be hardened. Further, when the adhesive layer formed of a material which is hardened by a pressure is located above the fingerprint sensor 120, the display device 100 may be damaged. In the case of a material which is hardened by a pressure, when a force having a predetermined pressure or higher is applied, the material may be hardened. However, if too much force is applied, the components such as a display panel located above the adhesive layer may be damaged. Accordingly, in the display device according to the exemplary embodiment of the present disclosure, the third adhesive layer 121 formed of a thermosetting material is located above the fingerprint sensor 120, so that the fingerprint sensor 120 may be adhered without causing the damage of the display panel 140.

Figure 2:
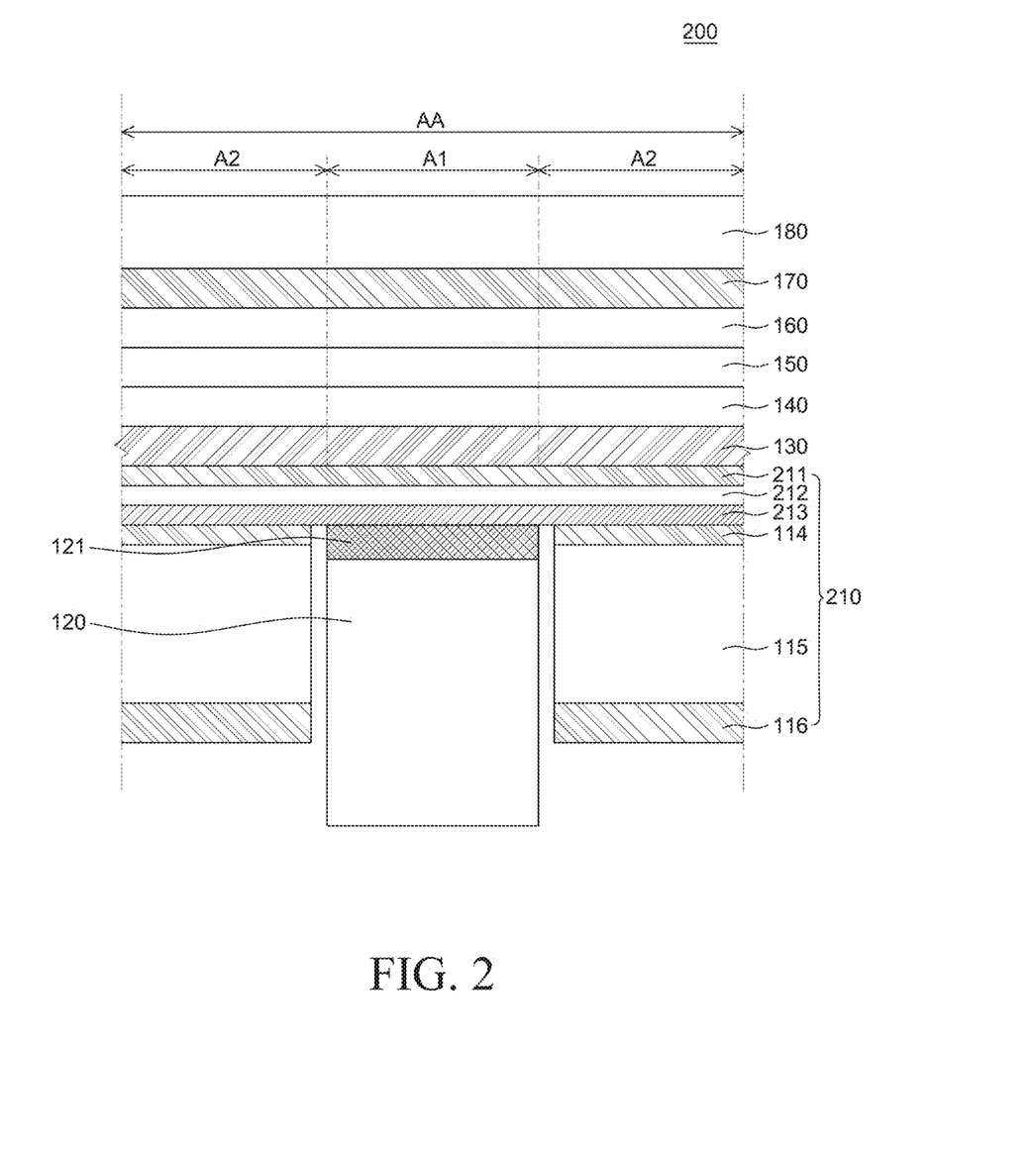
FIG. 2 is a cross-sectional view of a display device according to another exemplary embodiment of the present disclosure.

FIG. 2 is a cross-sectional view of a display device according to another exemplary embodiment of the present disclosure. A display device 200 of FIG. 2 is substantially the same as the display device 100 of FIG. 1 except that there is a difference in the cushion tape structure 210 so that a redundant description will be omitted.

Referring to FIG. 2, a first adhesive layer 211, a support layer 212, and a black layer 213 (e.g., a shielding layer) are also disposed in the first area A1. Specifically, the first adhesive layer 211, the support layer 212, and the black layer 213 may be disposed in both the first area A1 and the second area A2. Therefore, the fingerprint sensor 120 and the third adhesive layer 121 are disposed below the black layer 213.

In the display device 200 according to another exemplary embodiment of the present disclosure, the first adhesive layer 211, the support layer 212, and the black layer 213 are also disposed in the first area A1, so that the damage of the display panel 140 may be minimized. Specifically, there may be a space between the fingerprint sensor 120 and the cushion tape structure 210, and between the third adhesive layer 121 and the cushion tape structure 210. A process of forming the fingerprint sensor 120 below the display panel 140 may be performed by removing a part of the cushion tape structure 210 corresponding to the first area A1 and bonding the fingerprint sensor 120 to the first area A1 from which a part of the cushion tape structure 210 is removed using the third adhesive layer 121. Therefore, there may be a space between the fingerprint sensor 120 and the cushion tape structure 210, and between the third adhesive layer 121 and the cushion tape structure 210. In this case, light and heat may enter the display device 200 through the space between the fingerprint sensor 120 and the cushion tape structure 210, and between the third adhesive layer 121 and the cushion tape structure 210. When the light and heat enters the display panel 140, damage such as a shadow-mura may occur in the display panel 140. To improve this case, the light and heat may be blocked by the black layer 213 provided between the fingerprint sensor 120 and the display panel 140 so as not to reach to the display panel 140. The black layer 213 may also shield the display panel 140 for EMI generated by the fingerprint sensor 120 and shield the fingerprint sensor 120 from EMI generated by the display panel 140. Thus, the black layer 213 is a multi-shielding layer. Therefore, the black layer 213 is formed over the first area A1 and the second area A2 so that the light and heat entered through the space between the fingerprint sensor 120 and the cushion tape structure 210 may not be transmitted to the display panel 140. Therefore, the damage of the display panel 140 may be avoided.

Figure 3:
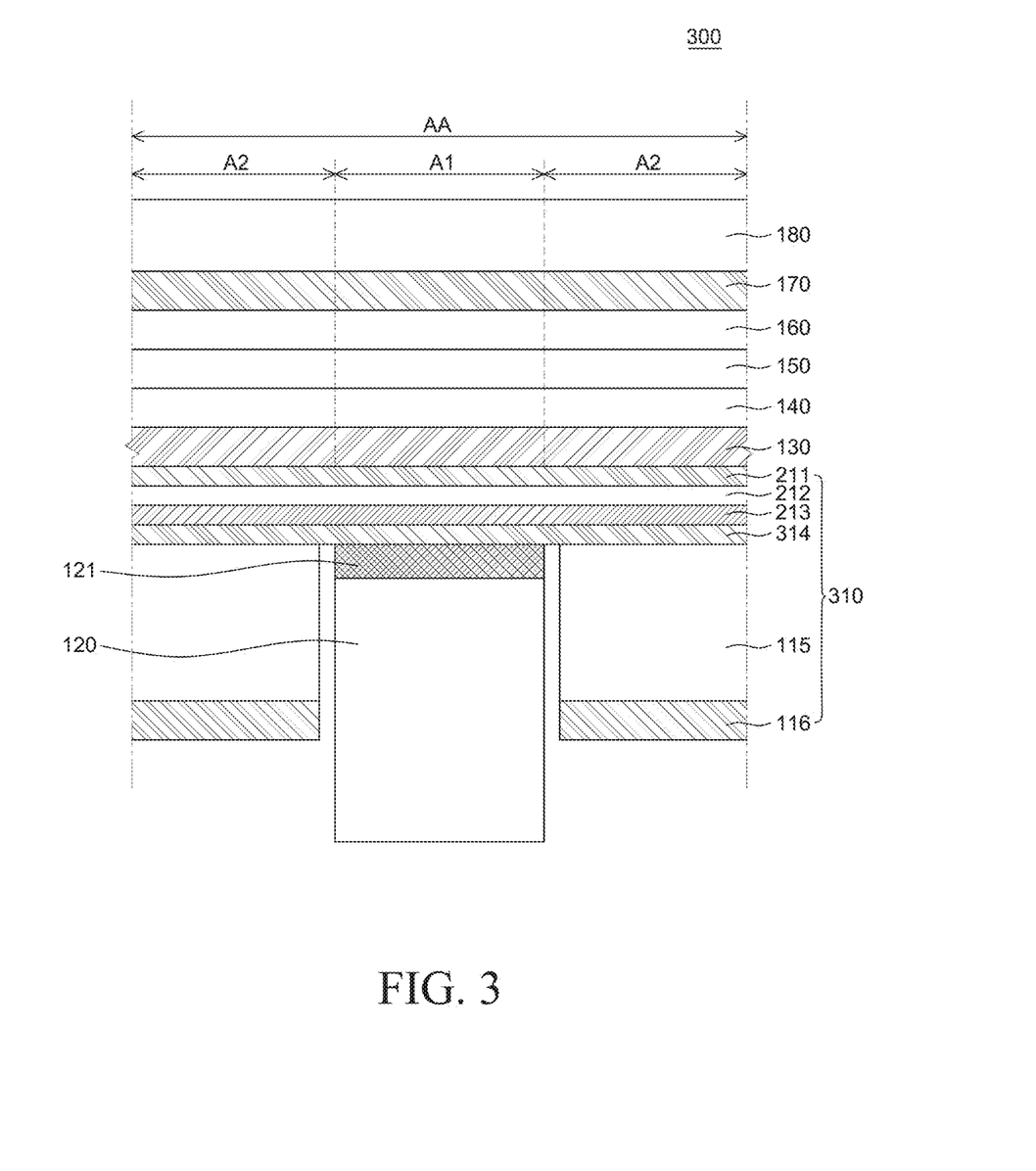
FIG. 3 is a cross-sectional view of a display device according to still another exemplary embodiment of the present disclosure.

FIG. 3 is a cross-sectional view of a display device according to another exemplary embodiment of the present disclosure. A display device 300 of FIG. 3 is substantially the same as the display device 200 of FIG. 2 except that there is a difference in the cushion tape structure 310 so that a redundant description will be omitted.

Referring to FIG. 3, a second adhesive layer 314 is disposed also in the first area A1. Specifically, the second adhesive layer 314 is disposed both in the first area A1 and the second area A2. Therefore, the fingerprint sensor 120 is disposed below the second adhesive layer 314.

In this case, differently as illustrated in FIG. 3, the third adhesive layer 121 may be removed. The third adhesive layer 121 disposed above the fingerprint sensor 120 is removed and the second adhesive layer 314 may be disposed above the fingerprint sensor 120. Therefore, the fingerprint sensor 120 may be adhered by the second adhesive layer 314.

In this case, the second adhesive layer 314 may have a property of the third adhesive layer 121 as described with reference to FIGS. 1 and 2. That is, the second adhesive layer 314 may be formed of a thermosetting material. Further, the second adhesive layer 314 may be hardened at a temperature lower than a temperature at which the display panel 140 is damaged. For example, the second adhesive layer 314 may be hardened at a temperature of 60° C. or lower. In the display device 300 according to another exemplary embodiment of the present disclosure, the second adhesive layer 314 is formed of the thermosetting material, so that the fingerprint sensor 120 may be adhered without causing the damage of the display device 300. Further, the second adhesive layer 314 may be formed of a material having a Young's modulus of 1 GPa or higher. In the display device 300 according to another exemplary embodiment of the present disclosure, the second adhesive layer 314 is formed of a material having a Young's modulus of 1 GPa or higher, so that the second adhesive layer 314 may be formed of a material having an acoustic impedance matching that of the black layer 213 disposed above the second adhesive layer 314. Therefore, the reflectance of the ultrasonic wave between the medium may be reduced. Accordingly, the fingerprint sensor 120 may more effectively sense the shape of the fingerprint.

Further, in the display device 300 according to still another exemplary embodiment of the present disclosure, the third adhesive layer 121 is removed and the fingerprint sensor 120 is disposed below the second adhesive layer 314 so that a thickness of the display device 300 is reduced and the ultrasonic wave is more effectively transmitted. Specifically, when the second adhesive layer 314 is disposed in the first area A1, even though the third adhesive layer 121 is not provided, the fingerprint sensor 120 is adhered to a lower portion of the black layer 213 by the second adhesive layer 314. Accordingly, since the third adhesive layer 121 is not provided, the thickness of the display device 300 may be reduced. Further, the ultrasonic wave emitted from the fingerprint sensor 120 does not pass through the third adhesive layer 121 so that the distortion of the ultrasonic wave may be reduced. When the ultrasonic wave passes through a medium, the signal distortion may be caused. Therefore, since the third adhesive layer 121 is not provided, the ultrasonic wave does not pass through the third adhesive layer 121. Therefore, the ultrasonic wave may pass through a reduced number of layers until the ultrasonic wave is reflected from an upper surface of the display device 300 to return to the fingerprint sensor 120. Accordingly, the fingerprint sensor 120 may more accurately sense the shape of the fingerprint.

Figure 4:
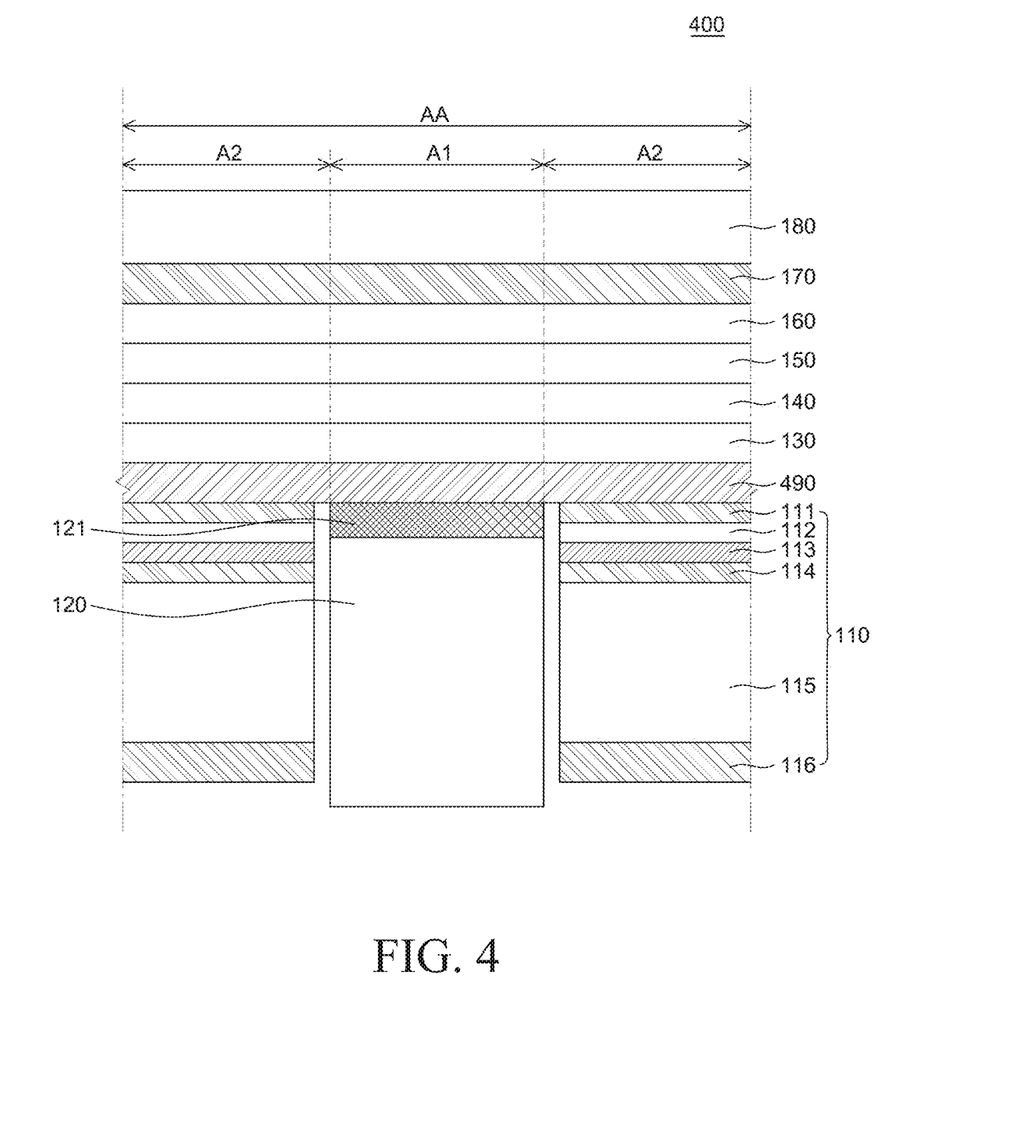
FIG. 4 is a cross-sectional view of a display device according to still another exemplary embodiment of the present disclosure.

FIG. 4 is a cross-sectional view of a display device according to still another exemplary embodiment of the present disclosure. A display device 400 of FIG. 4 is substantially the same as the display device 100 of FIG. 1 except that a metal layer 490 is further provided so that a redundant description will be omitted.

Referring to FIG. 4, a metal layer 490 is disposed between the cushion tape structure 110 and the display panel 140, and between the fingerprint sensor 120 and the display panel 140. The metal layer 490 is a layer formed of metal and serves as a shielding layer which blocks interference of a signal. Specifically, the metal layer 490 is disposed above the third adhesive layer 121 of the first area A1 and above the cushion tape structure 110 of the second area A2 and is disposed below the back plate 130 so as to be formed in both the first area A1 and the second area A2. Further, for example, the metal layer 490 may be formed of copper (Cu), aluminum (Al), silver (Ag), and the like.

Further, the metal layer 490 may be grounded. Specifically, the metal layer 490 may be connected to a printed circuit board electrically connected to a pad disposed in the non-display area and, for example, may be connected to a ground pad disposed in the printed circuit board to be grounded.

The metal layer 490 may serve as a shielding layer which blocks interference of a signal generated from the display panel 140 and a signal generated from the fingerprint sensor 120. Specifically, in the display panel 140, the signals may be generated by the display element and the wiring line disposed in the display panel 140. Further the fingerprint sensor 120 may emit an ultrasonic wave. In this case, a signal generated from the display panel 140 and a signal generated from the fingerprint sensor 120 may be interfered with each other. When the ultrasonic wave emitted from the fingerprinted sensor 120 is interfered with the signal generated from the display panel 140, the fingerprint sensor 120 may not properly sense a shape of the fingerprint. Therefore, in the display device 400 according to still another exemplary embodiment of the present disclosure, the metal layer 490 serving as a shielding layer which blocks the interference between signals is disposed between the cushion tape structure 110 and the display panel 140, and between the fingerprint sensor 120 and the display panel 140, so that the fingerprint sensor 120 may effectively sense the shape of the fingerprint without causing the interference of signals.

Figure 5A:
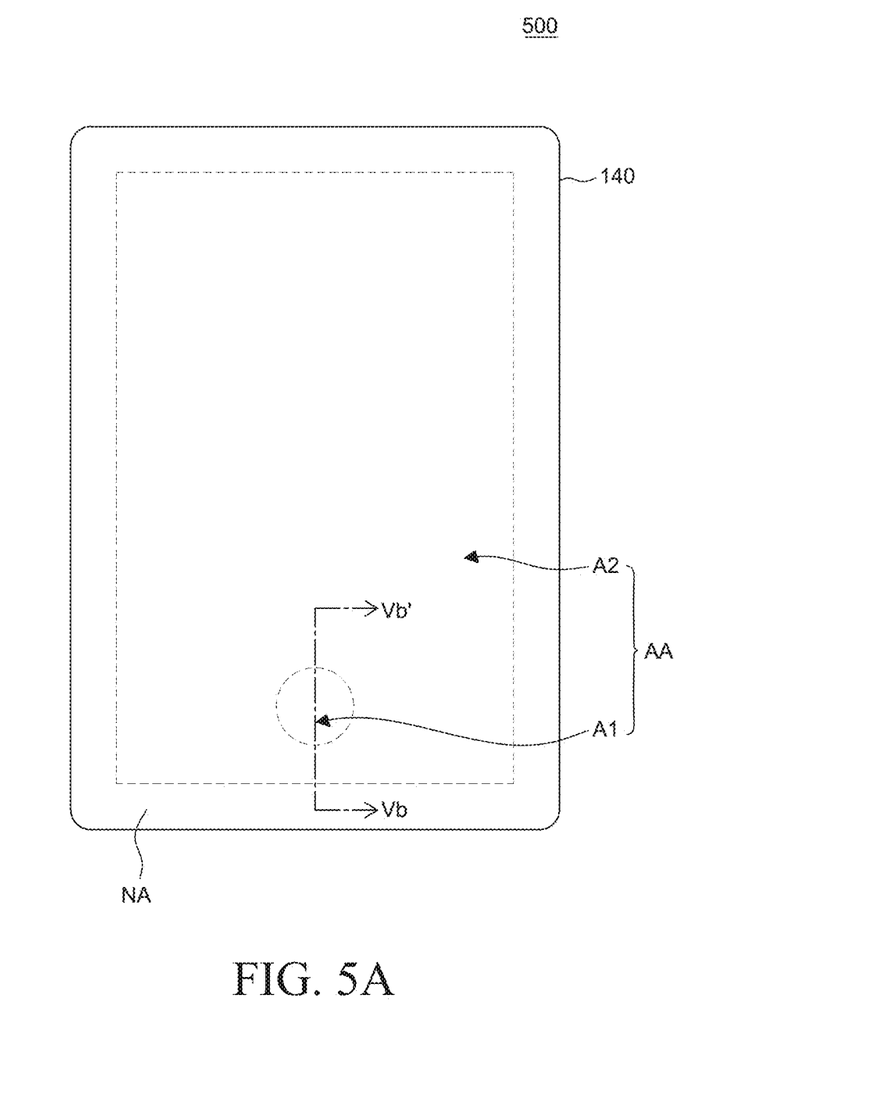
FIG. 5A is a plan view of a display device according to still another exemplary embodiment of the present disclosure.
Figure 5B:
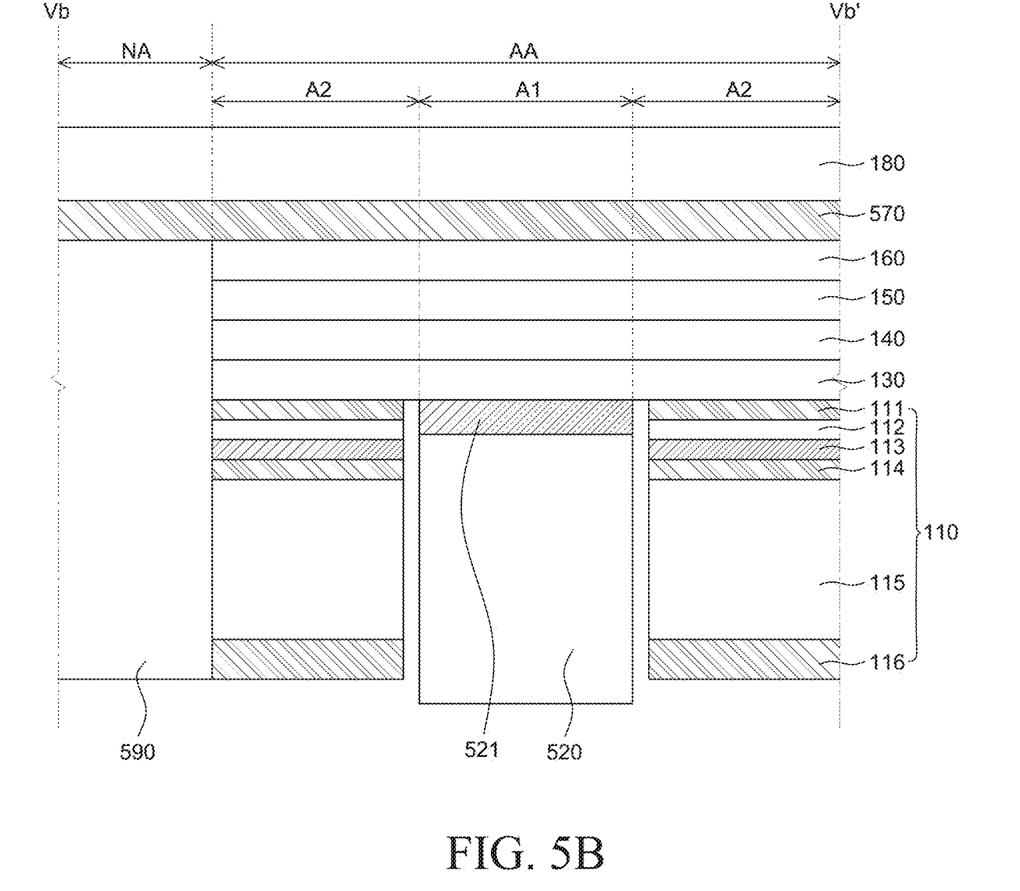
FIG. 5B is a cross-sectional view taken along Vb-Vb' of FIG. 5A according to an exemplary embodiment of the present disclosure.

FIG. 5A is a plan view of a display device according to still another exemplary embodiment of the present disclosure and FIG. 5B is a cross-sectional view taken along Vb-Vb' of FIG. 5A. A display device 500 of FIGS. 5A and 5B is substantially the same as the display device 100 of FIG. 1 except that a fingerprint sensor 520 and a third adhesive layer 521 are different from those of the display device 100 and an optical film 570 and an infrared light source 590 are included. Therefore, a redundant description thereof will be omitted.

Referring to FIGS. 5A and 5B, an infrared light source 590 is disposed in a non-display area NA. The infrared light source 590 refers to a light source which generates infrared light. The infrared light source 590 may be disposed below an optical film 570 of the non-display area NA. The infrared light source 590 is disposed in the non-display area NA so as not to overlap a display panel 140 disposed in the display area AA. Therefore, the image implemented in the display panel 140 may not be disturbed by the infrared light source 590. Further, the infrared light source 590 may generate light having a wavelength of 740 nm or longer.

The fingerprint sensor 520 may be an infrared sensor. The infrared sensor refers to a sensor which receives infrared light to sense a shape of the fingerprint. Specifically, the infrared light generated from the infrared light source 590 may be reflected from an upper surface of the display device 500 which is in contact with the finger and the fingerprint sensor 520 may receive the reflected infrared light. The fingerprint sensor 520 may receive the infrared light to recognize a shape of the fingerprint. Specifically, the infrared light generated from the infrared light source 590 may be reflected from an upper surface of the display device 500 which is in contact with the finger and the fingerprint sensor 520 may sense the reflected infrared light to recognize a shape of the fingerprint. However, the method of sensing a shape of the fingerprint by the fingerprint sensor 520 which is an infrared sensor is not limited thereto.

The optical film 570 may be disposed above the display panel 140 and the infrared light source 590. The optical film 570 refers to a film which passes a part of incident light and blocks the remaining incident light. The optical film 570 may be disposed above the polarizer 160 of the first area A1 and above the infrared light source 590 of the second area A2. That is, an adhesive layer is not disposed between the polarizer 160 and the cover glass 180, but the optical film 570 may be disposed therebetween.

The optical film 570 transmits infrared light and blocks visible light among light incident from outside of the display device 500. Specifically, the optical film 570 may transmit infrared light which is generated from the infrared light source 590 to be incident onto a lower portion of the optical film 570. Further, the optical film may transmit infrared light which is reflected from the upper surface of the display device 500 which is in contact with the finger to be incident onto an upper portion of the optical film 570. The infrared light which is transmitted from the lower portion of the optical film 570 may be received by the fingerprint sensor 520 and the fingerprint sensor 520 may sense the shape of the fingerprint.

Further, the optical film 570 may transmit visible light which is generated from the display panel 140 to be incident onto the lower portion of the optical film 570. The image implemented in the display panel 140 may be visible light and the visible light which is incident onto the lower portion of the optical film 570 may be transmitted to be implemented as an image on the upper surface of the display device 500. Differently from this, the optical film 570 may block visible light which is incident onto the upper surface of the display device 500 to be incident onto the upper portion of the optical film 570. That is, the optical film 570 may block the visible light incident from the upper portion and transmit the visible light incident from the lower portion.

Further, the optical film 570 may reduce a haze of light which passes through the optical film 570. Specifically, the optical film 570 may reduce a haze of infrared light which is incident onto one surface of the optical film 570 to pass through the other surface. Accordingly, the fingerprint sensor 520 may receive infrared light with reduced haze and more accurately sense the shape of the fingerprint. Further, the optical film 570 may reduce the haze of the visible light which is generated from the display panel 140 to transmit the visible light to the upper portion of the optical film 570. Therefore, the image implemented in the display device 500 may be clearer.

The display device 500 according to still another exemplary embodiment of the present disclosure transmits infrared light through the optical film 570 and selectively transmits only visible light incident from the lower portion among visible light and transmits light with a reduced haze. Therefore, the image implemented in the display device 500 is clearly displayed and the fingerprint sensor 520 may more accurately sense the shape of the fingerprint. The optical film 570 blocks the visible light which is incident from the upper portion of the display device 500 from passing through the lower portion of the optical film 570 so that the fingerprint sensor 520 may effectively receive the ultraviolet light without causing interference of the visible light. Accordingly, the fingerprint sensor 520 may more accurately sense the shape of the fingerprint. Further, the optical film 570 transmits only the visible light which is incident from the lower portion of the optical film 570 and blocks the visible light which is incident from the upper portion of the optical film 570 and reduces a haze of the visible light. Therefore, the image implemented in the display panel 140 may be more clearly displayed in the display device 500.

Referring to FIG. 5B, a cover glass 180 is disposed above the optical film 570. The cover glass 180 is a component which is located above the display device 500 to protect the display device 500. The cover glass 180 may be formed of a tempered glass.

Referring to FIG. 5B, the third adhesive layer 521 may include the same material as the optical film 570. Specifically, the third adhesive layer 521 transmits infrared light and blocks visible light among light incident from the outside. That is, the third adhesive layer 521 transmits the infrared light incident from the upper portion of the third adhesive layer 521 and blocks the visible light incident from the upper portion. Further, the third adhesive layer 521 may reduce a haze of the transmitted infrared light. Therefore, only the infrared light which passes through the third adhesive layer 521 may be incident into the fingerprint sensor 520 and the visible light which is incident into the third adhesive layer 521 may not be incident into the fingerprint sensor 520.

In the display device 500 according to still another exemplary embodiment of the present disclosure, the third adhesive layer 521 includes the same material as the optical film 570 so that the fingerprint sensor 520 may more accurately sense the shape of the fingerprint. The third adhesive layer 521 blocks the visible light which may be incident into the fingerprint sensor 520 and transmits only the infrared light to be incident into the fingerprint sensor 520. Therefore, the fingerprint sensor 520 receives only the infrared light without causing the interference of the visible light and thus more accurately senses the shape of the fingerprint.

In some exemplary embodiments, the third adhesive layer 521 may be formed of a thermosetting material. The third adhesive layer 521 may be hardened at a temperature lower than a temperature at which the display panel 140 is damaged. For example, the third adhesive layer 521 may be hardened at a temperature of 60° C. or lower. In the display device 500 according to another exemplary embodiment of the present disclosure, the third adhesive layer 521 is formed of the thermosetting material, so that the fingerprint sensor 520 may be adhered without causing the damage of the display device 500.

Further, the third adhesive layer 521 may be formed of a material having a Young's modulus of 1 GPa or higher. In the display device 500 according to another exemplary embodiment of the present disclosure, the third adhesive layer 521 is formed of a material having a Young's modulus of 1 GPa or higher, so that the third adhesive layer 521 may be formed of a material having an acoustic impedance matching that of the back plate 130 disposed above the third adhesive layer 521. Therefore, the reflectance of the ultrasonic wave between the medium may be reduced. Therefore, the fingerprint sensor 520 may more effectively sense the shape of the fingerprint. In the meantime, in some exemplary embodiments, the first adhesive layer 111, the support layer 112, and the black layer 113 may be disposed also in the first area A1. Specifically, the first adhesive layer 111, the support layer 112, and the black layer 113 may be disposed in both the first area A1 and the second area A2. Therefore, the fingerprint sensor 520 and the third adhesive layer 521 are disposed below the black layer 113. Accordingly, the display device 500 according to still another exemplary embodiment of the present disclosure may minimize the damage of the display panel 140. The light and heat may not enter the display device 140 by the black layer 113 disposed between the third adhesive layer 521 and the display panel 140, and between the fingerprint sensor 520 and the display panel 140 so that the damage of the display panel 140 may be avoided.

Further, in some exemplary embodiments, the first adhesive layer 111, the support layer 112, the black layer 113, and the second adhesive layer 114 may be disposed also in the first area A1. Specifically, the first adhesive layer 111, the support layer 112, the black layer 113, and the second adhesive layer 114 may be disposed in both the first area A1 and the second area A2. In this case, the third adhesive layer 521 may be removed. That is, the third adhesive layer 521 disposed above the fingerprint sensor 520 may be removed and the second adhesive layer 114 may be disposed above the fingerprint sensor 520.

The second adhesive layer 114 may be formed of a thermosetting material. Further, the second adhesive layer 114 may be hardened at a temperature lower than a temperature at which the display panel 140 is damaged. For example, the second adhesive layer 114 may be hardened at a temperature of 60° C. or lower. In the display device 500 according to another exemplary embodiment of the present disclosure, the second adhesive layer 114 is formed of the thermosetting material, so that the fingerprint sensor 520 may be adhered without causing the damage of the display device 500. Further, the second adhesive layer 114 may be formed of a material having a Young's modulus of 1 GPa or higher. In the display device 500 according to another exemplary embodiment of the present disclosure, the second adhesive layer 114 is formed of a material having a Young's modulus of 1 GPa or higher, so that the second adhesive layer 114 may be formed of a material having an acoustic impedance matching that of the black layer 113 disposed above the second adhesive layer 114. Therefore, the reflectance of the ultrasonic wave between the medium may be reduced. Accordingly, the fingerprint sensor 520 may more effectively sense the shape of the fingerprint.

Further, in the display device 500 according to still another exemplary embodiment of the present disclosure, the third adhesive layer 521 is removed and the fingerprint sensor 520 is disposed below the second adhesive layer 114 so that a thickness of the display device 500 is reduced and the infrared light is more effectively transmitted. Specifically, when the second adhesive layer 114 is disposed in the first area A1, even though the third adhesive layer 521 is not provided, the fingerprint sensor 520 is adhered to a lower portion of the black layer 113 by the second adhesive layer 114. Accordingly, since the third adhesive layer 521 is not provided, the thickness of the display device 500 may be reduced. Further, when the third adhesive layer 521 is provided, an intensity of the infrared light may be reduced while passing through the third adhesive layer 521. Therefore, since the third adhesive layer 521 is not provided, the fingerprint sensor 520 may receive the infrared light whose intensity is not reduced. Accordingly, the fingerprint sensor 520 may more accurately sense the shape of the fingerprint.

Figure 6:
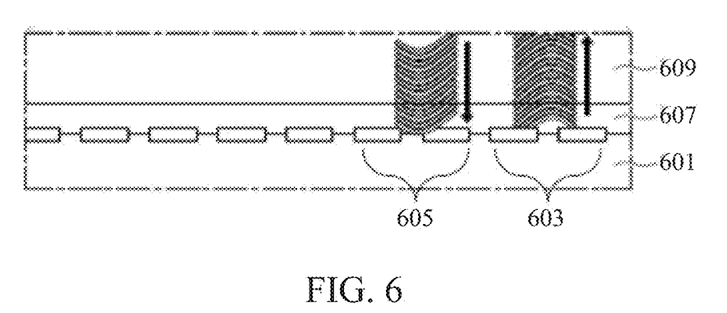
FIG. 6 is a cross-section view of a fingerprint sensor.

FIG. 6 is a cross-section view of a fingerprint sensor according to one embodiment. The embodiment of the fingerprint sensor shown in FIG. 6 may be implemented in any of the fingerprint sensors shown in FIGS. 1B, 2, 3, 4, 5A, and 5B.

As an example, the fingerprint sensor may be configured to include a sensor substrate 601, transmitting (Tx) electrodes 603 and receiving (Rx) electrodes 605 on the sensor substrate 601, a Tx/Rx layer 607 on the Tx electrodes 603 and Rx electrodes 605, and a cover substrate 609 on the Tx/Rx layer 607. However, the present disclosure is not limited thereto.

Generally, the fingerprint sensor obtains an image of a fingerprint by measuring the difference in density between fingerprint ridges (skin) and fingerprint valleys (air). Specifically, the Tx electrodes 603 may be configured to output ultrasonic waves to a finger, and the Rx electrodes 605 may be configured to sense ultrasonic waves reflected from the finger. Accordingly, the fingerprint sensor may be defined as an electrode structure configured to transmit and receive ultrasonic waves. An advantage of using ultrasonic technology to measure a fingerprint is the ability to penetrate through thicker layers of glass and transparent plastic as well as image through metal and opaque glass or plastic layers. Other advantages of using ultrasonic technology include higher resolution (in the range of 500-2000 PPI), the potential for scanning the internal structure of a finger (e.g., capillaries) which would make it extremely difficult to spoof, being able to determine heart rate, and an improved ability to cope with sweaty and dirty fingers.

The exemplary embodiments of the present disclosure can also be described as follows:

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
an electroluminescence display panel including a display area configured to display an image, the display area including a first area and a second area that is distinct from the first area, the first area for sensing a finger print and displaying the image, and the second area for displaying the image but not for sensing the fingerprint;
an ultrasonic fingerprint sensor under the electroluminescence display panel and in the first area of the display area but not in the second area of the display area, the ultrasonic fingerprint sensor configured to sense the fingerprint in the first area of the display area;
an impact mitigating layer in the second area of the display area but not in the first area of the display area and configured to absorb impacts or pressure to the display device, the impact mitigating layer under the electroluminescence display panel and at least partially surrounding the ultrasonic fingerprint sensor such that a gap is formed between the impact mitigating layer and the ultrasonic fingerprint sensor;
a shielding layer between the electroluminescence display panel and the ultrasonic fingerprint sensor and the impact mitigating layer that are under the electroluminescence display panel and covering the gap, the shielding layer configured to block at least one of heat, electromagnetic interference, or light from the gap; and
a first adhesive layer that is between the impact mitigating layer and the shielding layer in the second area without being disposed in the first area such that the first adhesive layer overlaps the impact mitigating layer without overlapping the ultrasonic fingerprint sensor.

2. The display device of claim 1, wherein the shielding layer is disposed in the first area and the second area of the display area and covers the gap.

3. The display device of claim 1, wherein the impact mitigating layer includes a first surface and a second surface that is below the first surface, and the display device further comprises:
a heat dissipation layer in the second area of the display area but not in the first area of the display area, the heat dissipation layer on the second surface of the impact mitigating layer and configured to at least partially dissipate heat in the display device.

4. The display device of claim 3, wherein the shielding layer includes a first surface and a second surface that is below the first surface,
wherein the first adhesive layer includes a first surface and a second surface that is opposite the first surface, the first surface of the first adhesive layer on the second surface of the shielding layer in the second area; and
wherein the first surface of the impact mitigating layer is on the second surface of the first adhesive layer in the second area.

5. The display device of claim 4, further comprising:
a second adhesive layer on the ultrasonic fingerprint sensor, the second adhesive layer attaching the ultrasonic fingerprint sensor to the display device.

6. The display device of claim 5, wherein the second adhesive layer is disposed within the first area of the display area but is not disposed within the second area of the display area.

7. The display device of claim 5, further comprising:
a flexible substrate;
a third adhesive layer on the flexible substrate; and
a support layer between the third adhesive layer and the shielding layer.

8. The display device of claim 7, further comprising:
a back plate on the third adhesive layer, the back plate between the third adhesive layer and the electroluminescence display panel, the back plate supporting the electroluminescence display panel and the ultrasonic fingerprint sensor.

9. The display device of claim 8, wherein the second adhesive layer comprises a Young's modulus of at least 1 gigapascal.

10. A display device comprising:
a first impact mitigating portion of an impact mitigating layer that is capable of absorbing impacts or pressure applied to the display device;
a second impact mitigating portion of the impact mitigating layer that is capable of absorbing impacts or pressure applied to the display device, the second impact mitigating portion in a same plane as the first impact mitigating portion;
an ultrasonic fingerprint sensor between the first impact mitigating portion and the second impact mitigating portion such that a first gap is formed between the ultrasonic fingerprint sensor and the first impact mitigating portion and a second gap is formed between the ultrasonic fingerprint sensor and the second impact mitigation portion, the ultrasonic fingerprint sensor configured to sense a fingerprint of a finger touching the display device;
a shielding layer on the first impact mitigating portion, the second impact mitigating portion, and the ultrasonic fingerprint sensor, the shielding layer configured to block at least one of heat, electromagnetic interference, or light from the first gap and the second gap;
an electroluminescence display panel on the shielding layer, the electroluminescence display panel configured to display an image;
a first adhesive portion of a first adhesive layer that is between the first impact mitigating portion and the shielding layer such that the first adhesive portion overlaps the first impact mitigating portion without overlapping the ultrasonic fingerprint sensor; and
a second adhesive portion of the first adhesive layer that is between the second impact mitigating portion and the shielding layer such that the second adhesive portion overlaps the second impact mitigating portion without overlapping the ultrasonic fingerprint sensor.

11. The display device of claim 10,
a first heat dissipation layer on the first impact mitigating portion, the first heat dissipation layer at least partially dissipating heat in the first impact mitigating portion; and
a second heat dissipation layer on the second impact mitigating portion, the second heat dissipation layer at least partially dissipating heat in the second impact mitigating portion.

12. The display device of claim 10, further comprising:
a second adhesive layer on the ultrasonic fingerprint sensor, the second adhesive layer attaching the ultrasonic fingerprint sensor to the first adhesive layer.

13. The display device of claim 12, further comprising:
a plastic substrate;
a third adhesive layer on the plastic substrate;
a support layer between the third adhesive layer and the shielding layer.

14. The display device of claim 13, further comprising:
a back plate between the third adhesive layer and the electroluminescence display panel, the back plate supporting the electroluminescence display panel and the ultrasonic fingerprint sensor.

15. The display device of claim 14, wherein an acoustic impedance of the second adhesive layer matches an acoustic impedance of the back plate.

16. A display device comprising:
an electroluminescence display panel including a display area configured to display an image;
an ultrasonic fingerprint sensor under the electroluminescence display panel;
an impact mitigating layer under the electroluminescence display panel, wherein a gap is formed between the impact mitigating layer and the ultrasonic fingerprint sensor;
a shielding layer overlapping at least the gap and the ultrasonic fingerprint sensor, the shielding layer configured to shield the electroluminescence display panel and the ultrasonic fingerprint sensor from each other; and
a first adhesive layer including a first surface and a second surface that is opposite the first surface, the first surface of the first adhesive layer directly on the impact mitigating layer; and
wherein the electroluminescence display panel is on the second surface of the first adhesive layer.

17. The display device of claim 16, wherein the shielding layer is grounded.

18. The display device of claim 16, wherein the shielding layer comprises metal.

19. The display device of claim 16, wherein the shielding layer is disposed in the display area.

20. The display device of claim 16, further comprising:
a second adhesive layer on the ultrasonic fingerprint sensor, the second adhesive layer attaching the ultrasonic fingerprint sensor to the display device.

* * * * *